United States Patent
Kiayias et al.

(10) Patent No.: US 9,015,850 B2
(45) Date of Patent: Apr. 21, 2015

(54) DETECTING AND REVOKING PIRATE REDISTRIBUTION OF CONTENT

(75) Inventors: Aggelos Kiayias, Willimantic, CT (US); Serdar Pehlivanoglu, Kayseri (TR)

(73) Assignee: The University of Connecticut, Farmington, CT (US)

(*) Notice: Subject to any disclaimer, the term of this patent is extended or adjusted under 35 U.S.C. 154(b) by 1176 days.

(21) Appl. No.: 12/476,035

(22) Filed: Jun. 1, 2009

(65) Prior Publication Data

US 2010/0043081 A1 Feb. 18, 2010

Related U.S. Application Data

(60) Provisional application No. 61/189,044, filed on Aug. 16, 2008.

(51) Int. Cl.
| | |
|---|---|
| G06F 7/04 | (2006.01) |
| H04L 9/08 | (2006.01) |
| H04N 21/258 | (2011.01) |
| H04N 21/442 | (2011.01) |

(52) U.S. Cl.
CPC .............. *H04L 9/0891* (2013.01); *H04L 9/083* (2013.01); *H04L 2209/60* (2013.01); *H04L 2209/606* (2013.01); *H04N 21/2585* (2013.01); *H04N 21/44236* (2013.01)

(58) Field of Classification Search
CPC ................................................ H04L 2209/608
USPC ............................................................ 726/26
See application file for complete search history.

(56) References Cited

U.S. PATENT DOCUMENTS

| | | | |
|---|---|---|---|
| 6,289,455 B1* | 9/2001 | Kocher et al. ................... 705/65 |
| 2002/0114471 A1* | 8/2002 | Fagin et al. .................... 380/286 |
| 2004/0111611 A1* | 6/2004 | Jin et al. ........................ 713/163 |
| 2004/0186999 A1* | 9/2004 | Kim et al. ...................... 713/171 |
| 2007/0067242 A1 | 3/2007 | Lotspiech et al. .............. 705/57 |
| 2007/0067244 A1* | 3/2007 | Jin et al. ......................... 705/59 |
| 2007/0165853 A1 | 7/2007 | Jin et al. ........................ 380/210 |
| 2007/0174637 A1* | 7/2007 | Lotspiech et al. ............ 713/190 |
| 2008/0075287 A1 | 3/2008 | Boneh et al. .................. 380/277 |
| 2008/0133938 A1 | 6/2008 | Kocher et al. ................. 713/193 |
| 2008/0137848 A1 | 6/2008 | Kocher et al. ................. 380/201 |
| 2008/0137864 A1 | 6/2008 | Jin et al. ........................ 380/277 |
| 2009/0319227 A1* | 12/2009 | Jin et al. ........................ 702/181 |
| 2009/0320130 A1* | 12/2009 | Jin et al. ......................... 726/22 |
| 2010/0043081 A1* | 2/2010 | Kiayias et al. ................. 726/30 |

OTHER PUBLICATIONS

International Search Report, for PCT Application No. PCT/US09/45842, mailed on Sep. 23, 2009.

* cited by examiner

*Primary Examiner* — Jacob C. Coppola
(74) *Attorney, Agent, or Firm* — Ohlandt, Greeley, Ruggiero & Perle, L.L.P.

(57) ABSTRACT

Disclosed are methods, systems and articles for tracing and disabling one or more unauthorized distributors of content originally transmitted by a distribution center. In some embodiments, a method includes receiving rebroadcast transmissions of a data segment previously transmitted by the distribution center, the received segment including embedded information associated with a subset of recipients that includes at least one of the unauthorized distributors, and identifying the subset based on the embedded information. The method further includes assigning recipients in the identified subset into two or more new subsets such that the at least one unauthorized distributor is assigned to one of the two or more new subsets, and coding a subsequent data segment to be transmitted with additional embedded information associated with the two or more new subsets. The above operations may be repeated until the at least unauthorized distributor is identified.

19 Claims, 4 Drawing Sheets

DETECTING AND REVOKING PIRATE REDISTRIBUTION OF CONTENT

CROSS-REFERENCE TO RELATED APPLICATION

This application claims priority to provisional U.S. application Ser. No. 61/189,044, entitled "System to Detect and Revoke Pirate Redistribution of Digital Content," filed Aug. 16, 2008, the content of which is hereby incorporated by reference in its entirety.

STATEMENT OF GOVERNMENT SUPPORT

The present invention was developed in part with funding from the National Science Foundation (NSF) under Grant Award #0447808. The United States Government has certain rights in this invention.

BACKGROUND

The present disclosure relates to the field of systems for secure communication and distribution of digital content in any of its various forms, including, but not limited to text, information, software, images, video, sound, music and combinations thereof, through communication and distribution methodologies that utilize the Internet and other telecommunications technologies. More particularly, the present disclosure relates to systems, methods and articles to tracing rebroadcast transmission by unauthorized distributors, and revoking keys previously assigned to such unauthorized distributors.

In a broadcast encryption setting, a transmission center transmits (e.g., broadcasts) content to a number N of recipients. An objective of such content transmission is to use the broadcast medium in such a way so that the center can revoke at will any subset of size R recipient from the population of recipients. To achieve this objective, the same decryption key cannot be provided to all the recipients. Two possible solutions that may be used to the broadcast encryption problem exhibit trade-offs between the receiver storage requirement and the ciphertext length. In a first such solution, each receiver (or recipient) obtains a personal key and subsequently the transmission center can use the broadcast medium to simulate a unicast by transmitting a (vector) ciphertext of length N-R. While this solution is optimal from the receiver storage point of view, this solution, on the other hand, results in a substantial waste of bandwidth. In a second solution, the center assigns a different key to any subset of receivers and each receiver is handed the keys for all the subsets it belongs to. In this case the ciphertext has a more optimal length, but each receiver is required to store $2^{N-1}$ keys, which is an exponential blow-up of storage requirements. Other solutions offering improved trade-offs have been proposed, including the solution described by in Naor et al., "Revocation and Tracing Schemes for Stateless Receivers", CRYPTO 20001, LNCS 2139, Spring 2001, pp. 41-62, the content of which is hereby incorporated by reference in its entirety, in which a procedure that used a ciphertext with a length proportional to the number of revoked users R, enabled unlimited number of revocations.

One form of unauthorized distribution of content is the so-called Pirate Rebroadcast Attack in which traitors (adversarial receivers that enable content they receive to be provided to non-subscribers) first decrypt the content by using their key material and then, once the content data is in clear text form, they rebroadcast the content. In this form of unauthorized distribution the rebroadcast data generally does not provide information about the traitor keys used to decode the transmissions from the transmission center. A solution to this problem would be the use of digital marking (e.g., watermarking) techniques where the content itself becomes varied over the user population. One form of this solution would be to mark the content individually so that each user has its own copy. However, this particular solution requires too much bandwidth. Two techniques that relax the bandwidth requirement include dynamic traitor tracing and sequential traitor tracing. In both these approaches the transmission center controls the marking of content, and by observing the feedback from the pirate rebroadcast it can identify the traitors. In the dynamic traitor tracing approach the center obtains feedback for every transmission and tries to localize the suspect list by reassigning the marks adaptively. The number of traitors is not known beforehand and the system adjusts itself after each feedback. In sequential traitor tracing, the assignment of marks to the variations is predetermined (hence the transmission mechanism is not adaptive to the feedback). The above tracing techniques do not provide revocation capabilities.

Another conventional tracing approach is the Advanced Access Content System (AACS) (as described, for example, in "AACS Specification", 2006, the content of which is hereby incorporated by reference in its entirety) which is the current standard for content scrambling of Blu-Ray disks and HD-DVDs and offers a trace and revoking mechanism for pirate rebroadcasts. However, the AACS scheme is generally found to enable a limited number of revocations that is typically limited by the number of stored keys in a receiver. The AACS scheme generally also has a limit on the maximum number of traitors that can be identified.

SUMMARY

The present disclosure is directed to technology, systems, methods and articles by which content creators and producers can distribute their product with digital communication media in a way that enables access in accordance with the uses approved by and the restrictions desired by those creators and producers.

The present disclosure is further directed to a technological approach to achieve effective digital content distribution (DCD) in conjunction with effective enforcement of intellectual property rights related to such content.

The field of the present disclosure and terms currently used in this disclosure are also described in the on-line publication by A. Kiayias, "Managing the Unmanageable: Putting Cryptography to Work for Digital Rights", *Computing Reviews*, the content of which is hereby incorporated by reference in its entirety.

Described herein are systems, methods and articles for tracing and revoking pirate rebroadcasts, including systems, methods and articles configured to revoke an unlimited number of users. Implementations of the systems, methods and articles of the present disclosure provide considerable flexibility in the choice of the basic parameters such as the communication overhead (which includes the amount of replication necessary in order to transmit a key), the rebroadcast bound (which is the maximum number of transmissions a rebroadcasting pirate can "survive" before its keys are revoked) and the marking alphabet which refers to the number of different variants of the content that the transmission center should create.

In some embodiments, the systems, methods and articles include identifying from a feedback transmission that includes embedded information, a subset of recipients associated with the embedded information, splitting the identified subset into two or more new subsets, assigning recipients in the identified subset into the two or more new subsets, and marking the two or more new subsets with additional embedded information that can later be used to identify one of the new subsets that contain an unauthorized distributor. Through this assignment of recipients to smaller subsets which are then marked with additional embedded information (e.g., newly generated fingerprint codes), the identity of the unauthorized distributor(s) becomes progressively more localized.

In some embodiments, implementations of the systems, methods and articles employ a binary marking alphabet and can handle an unlimited number of traitors and revocations. In such embodiments, the communication overhead is additively linear to the number of revoked users R and the number of traitors t. As a result, as the communication overhead grows linearly in the number of malicious users, the constant hidden in the asymptotic notation is small (it is 2R+4t in the worst case). The pirate rebroadcast bound on the other hand is quadratic in the communication overhead and depends logarithmically on the total number of users. Such implementations can thus perform tracing and revoking for an arbitrary number of users with the penalty being that of an extended rebroadcast bound as the number of revocations increases.

In some embodiments, implementations of the systems, methods and articles employ a binary alphabet and impose a bound w on the size of the maximum traitor coalition. In such embodiments, the maximum pirate rebroadcast bound depends logarithmically on the number of revoked users (while being polynomially bounded on w).

In some embodiments, implementations of the systems, methods and articles further improve on the rebroadcast bound by employing a larger marking alphabet size of, for example, 2t+1, where t is the number of traitors. The resultant bound is expressed as $O(t \log (N/t))$ (where the function $O(\cdot)$ is the "Big O" function that provides an estimate of computational complexity) and thus improves on the previously known convergence bound of $O(t \log N)$ for the same alphabet size for dynamic traitor tracing that was described and computed, for example, in A. Fiat et al., "Dynamic Traitor Tracing", Journal of Cryptology, Vol. 4(3), pp. 211-223, 2001, the content of which is hereby incorporate by reference in its entirety.

The current subject matter of the present disclosure is directed to detecting and countering threats to secure distribution of digital content, including distribution of encrypted content. The current subject matter of the present disclosure is further directed to tracing and revoking pirate redistribution of digital content.

The current subject matter of the present disclosure provides advantages in the detection and countering of attacks by so-called adversaries to digital content distribution (DCD) systems. Such attacks may include one or more of unauthorized content reception, ownership hijacking, unauthorized content redistribution, access of content outside of an authorized environment, and access or distribution of content in violation of one or more licenses or subscriptions. Such adversaries are sometimes referred to by those in the field as hackers, pirates, leakers or traitors. By way of example, a pirate in the context of the field is considered to be one who illegally or without authority distributes digital content after breaking through or hacking protections such as encryption that accompany the content as disseminated by an original and authorized source, or by legitimately decoding the content (if the pirate is a subscriber of the transmission center) and redistributing the content to non-subscribers of the transmission center.

In some embodiments, implementations of the systems, methods and articles require marking codes (e.g., fingerprint codes) with a number of codewords that is proportional to the number of revoked users and active traitors, rather than in proportion to the whole population. In contrast, conventional traceability techniques generally use codes with a number of codewords proportional to the population size given a fixed small number of revoked users or traitors. The systems, methods and articles described herein can use fingerprinting codes that take into account arbitrary traitor collusions without adversely affecting the efficiency of the implementations described herein. The implementations described herein can therefore trace and revoke an unlimited number of traitors. In the implementation of the systems, methods and articles described herein, the operation of "picking a code" is generally not a computationally intensive operation because the codes can be sampled very efficiently or can be available in the form of a codebook. Further, because the code selection operations are performed at the transmission center and not at the decoding devices (of the recipients), the code selection operation does not affect the complexity of the decoding devices.

a setting of encrypted content distribution, such as an encrypted transmission or broadcast to authorized receivers, authorized receivers are provided with keys allowing them to decode, i.e., decrypt, the encryption associated with the distribution and thereby access the content.

In one aspect, a method for tracing and disabling one or more unauthorized distributors of content originally transmitted by a distribution center is disclosed. The method includes receiving rebroadcast transmissions of a data segment previously transmitted by the distribution center, the received rebroadcast data segment including embedded information associated with a subset of recipients of the data segment, the subset of the recipients including at least one of the one or more unauthorized distributors, and identifying based on the embedded information in the received rebroadcast transmissions the subset of recipients that includes the at least one of the one or more unauthorized distributors. The method further includes assigning recipients in the identified subset of recipients into two or more new subsets such that the at least one of the one or more unauthorized distributors is assigned to one of the two or more new subsets having fewer assigned recipients than the number of recipients in the identified subset, and coding a subsequent data segment to be transmitted with additional embedded information associated with the two or more new subsets.

Some embodiments may include one or more of the following features.

The method may further include repeating the receiving, the identifying, the assigning and the coding until a rebroadcast transmission is received that is associated with a subset including a single recipient corresponding to the at least one of the one or more unauthorized distributors.

Coding may include coding, in response to receipt of the subset including the single recipient corresponding to the at least one of the one or more unauthorized distributors, further subsequent data segments with encryption codes such that the single recipient corresponding to the at least one of the one or more unauthorized distributors cannot decrypt the further subsequent data segments.

Assigning may further include identifying one or more keys that are common to all the recipients in the identified at least one of the two or more subsets. Coding the subsequent data segment may further include encrypting the data segment using keys excluding the identified one or more common keys of the recipients in the identified subset.

At least one of the embedded information and the additional embedded information may include one or more of, for example, fingerprint codes and/or watermarks.

The embedded information included in the received rebroadcast transmission may include a portion of a marking code identifying the at least one of the one or more unauthorized distributors such that a composite of the portion of the marking code and other portions of the marking code received in other rebroadcast transmissions that are in sequence with the received broadcast transmission form the marking code.

Coding the subsequent data segment to be transmitted may include encrypting the subsequent data segment using a first encryption key, and encrypting the first encryption keys with additional keys, at least some of the additional keys corresponding to the two or more new subsets. Encrypting the first encryption key may include encrypting with keys common to all recipients in the respective two or more new subsets.

The additional embedded information may correspond to any number of variations ranging from a minimum number of two variations to any number that is allowed by the nature of the underlying media.

In another aspect, a method for tracing and disabling one or more unauthorized distributors of content originally transmitted by a distribution center is disclosed. The method includes coding data to include in the coded data embedded information associated with two or more subsets of a plurality of recipients, transmitting the coded data to the plurality of recipients, and receiving rebroadcast transmissions of the data previously transmitted by the distribution center, the received rebroadcast data segment including embedded information associated with at least one of the two or more subsets of the plurality of recipients, the at least one of the two or more subsets of the plurality of recipients including at least one of the one or more unauthorized distributors. The method further includes identifying based on the embedded information in the received rebroadcast transmissions the at least one of the two or more subsets including the at least one of the one or more unauthorized distributors, assigning recipients in the identified at least one of the two or more subsets into additional two or more new subsets such that the at least one of the one or more unauthorized distributors is assigned to one of the two or more new subsets having fewer assigned recipients than the number of recipients in the identified at least one of the two or more subsets, marking the two or more new subsets with additional embedded information identifying at least the two or more new subsets, and iteratively repeating the coding, transmitting, receiving, identifying, assigning and marking until a rebroadcast transmission is received that is associated with a subset including a single recipient corresponding to the at least one of the one or more unauthorized distributors.

Embodiments of the method may include any one of the features described above in relation to the first method, as well as one or more of the following features.

Assigning may further include identifying one or more keys that are common to all the recipients in the identified at least one of the two or more subsets. Coding the data may further include coding a subsequent data segment to encrypt the subsequent data segment using keys excluding the identified one or more common keys of the recipients in the identified at least one of the two or more subsets.

At least one of the embedded information and the additional embedded information may include one or more of, for example, fingerprint codes and/or watermarks.

In a further aspect, a system for tracing and disabling one or more unauthorized distributors of content originally transmitted by a distribution center is disclosed. The system includes a transceiver to transmit coded data to a plurality of recipients, the coded data including embedded information associated with two or more subsets of the plurality of recipients, and receive rebroadcast transmissions of the data previously transmitted by the distribution center, the received rebroadcast transmissions including the embedded information associated with at least one of the two or more subsets of the plurality of recipients, the at least one of the two or more subsets including at least one unauthorized distributor. The system further includes at least one processor-based computing device that, when executing computer instructions stored on a storage medium connected to the at least one processor-based computing device, is configured to identify based on the embedded information in the received rebroadcast transmissions the at least one of the two or more subsets that include the at least one unauthorized distributor, assign recipients in the identified at least one of the two or more subsets into additional two or more new subsets such that the at least one unauthorized distributor is assigned to one of the two or more new subsets having fewer assigned recipients than the number of recipients in the identified at least one of the two or more subsets, mark the two or more new subsets with additional embedded information identifying at least the two or more new subsets, and iteratively repeat the identifying, assigning and marking operations and iteratively cause the transmitting and receiving operations performed by the transceiver until a rebroadcast transmission is received that is associated with a subset including a single recipient corresponding to the at least one unauthorized distributor.

Embodiments of the system may include any one of the features described above in relation to the methods, as well as one or more of the following features.

The transceiver may include a network gateway portal connected to a network that is further connected to at least some of the plurality of recipients. The network may include one or more of, for example, a wired network and/or a wireless network.

The at least one processor-based computing device may further be configured to code the data transmitted to the plurality of recipients.

The at least one processor based device configured to assign may further be configured to identify one or more keys that are common to all the recipients in the identified at least one of the two or more subsets. The at least one processor-based device configured to code the data may be further configured to code a subsequent data segment to encrypt the subsequent data segment using keys excluding the identified one or more common keys of the recipients in the identified at least one of the two or more subsets.

At least one of the embedded information and the additional embedded information may include one or more of, for example, fingerprint codes and/or watermarks.

In yet another aspect, a computer program product residing on a computer readable medium is disclosed. The computer program product includes computer instructions that when executed on a processor-based device at a distribution center cause the processor-based device to code data to include in the coded data embedded information associated with two or more subsets of a plurality of recipients, transmit the coded data to the plurality of recipients, and receive rebroadcast transmissions of the data previously transmitted by the distribution center, the received rebroadcast data segment including embedded information associated with at least one of the two or more subsets of the plurality of recipients, the at least one of the two or more subsets of the plurality of recipients including at least one unauthorized distributor. The computer instructions further cause the processor-based device to identify based on the embedded information in the received rebroadcast transmissions the at least one of the two or more subsets including the at least one unauthorized distributor, assign recipients in the identified at least one of the two or more subsets into additional two or more new subsets such that the at least one unauthorized distributor is assigned to one of the two or more new subsets having fewer assigned recipients than the number of recipients in the identified at least one of the two or more subsets, mark the two or more new subsets with additional embedded information identifying at least the two or more new subsets, and iteratively repeat the coding, transmitting, receiving, identifying, assigning and marking until a rebroadcast transmission is received that is associated with a subset including a single recipient corresponding to the at least one of the one or more unauthorized distributors.

Embodiments of the computer program product may include any one of the features described above in relation to the methods and the system, as well as one or more of the following features.

The computer instructions that cause the processor-based device to assign may further include instructions that, when executed, cause the processor-based device to identify one or more keys that are common to all the recipients in the identified at least one of the two or more subsets. The computer instructions that cause the processor-based device to code may further include instructions that, when executed, cause the processor-based device to code a subsequent data segment to encrypt the subsequent data segment using keys excluding the identified one or more common keys of the recipients in the identified at least one of the two or more subsets.

Details of one or more implementations are set forth in the accompanying drawings and in the description below. Further features, aspects, and advantages will become apparent from the description, the drawings, and the claims.

DETAILED DESCRIPTION

Disclosed are systems, methods and articles for tracing unauthorized re-transmissions (re-distribution, e.g., via broadcasting methodologies) of content, and disabling such unauthorized re-transmissions by, for example, revoking keys required by an unauthorized distributor to decrypt the content received from a distribution center. As will be described in greater detail below, in some embodiments, the systems, methods and articles include coding a data segment to be transmitted to multiple recipients. The multiple recipients are assigned to two or more subsets of recipients. The coded data segment includes embedded information associated with the two or more subsets of the recipients such that upon detection of a rebroadcast of the data segment by a rogue (e.g., unauthorized) distributor, the identity of a subset of recipients that includes the unauthorized distributor could be determined.

Rebroadcast transmissions of the data segment transmitted are subsequently received by the transmission center. The received rebroadcast data segment includes embedded information associated with at least one of the two or more subsets of the plurality of recipients. The at least one of the two or more subsets includes at least one of the one or more unauthorized distributors. Upon receipt of the rebroadcast transmissions, the at least one of the two or more subsets that include the at least one of the one or more unauthorized distributors is identified based on the embedded information in the received rebroadcast transmissions.

The recipients in the identified at least one of the two or more subsets are assigned into additional two or more new subsets such that the at least one of the one or more unauthorized distributors is assigned to one of the two or more new subsets. Each of those two or more new subsets has fewer assigned recipients than the number of recipients in the identified at least one of the two or more subsets. As will become apparent below, through this assignment of recipients to smaller subsets which are then marked with additional embedded information (e.g., newly generated fingerprint codes), the identity of the unauthorized distributors becomes progressively more localized. The operations of coding, receiving, identifying and assigning are iteratively repeated until a final new subset is generated that includes a recipient corresponding to the at least one of the one or more unauthorized distributors.

Figure 1:
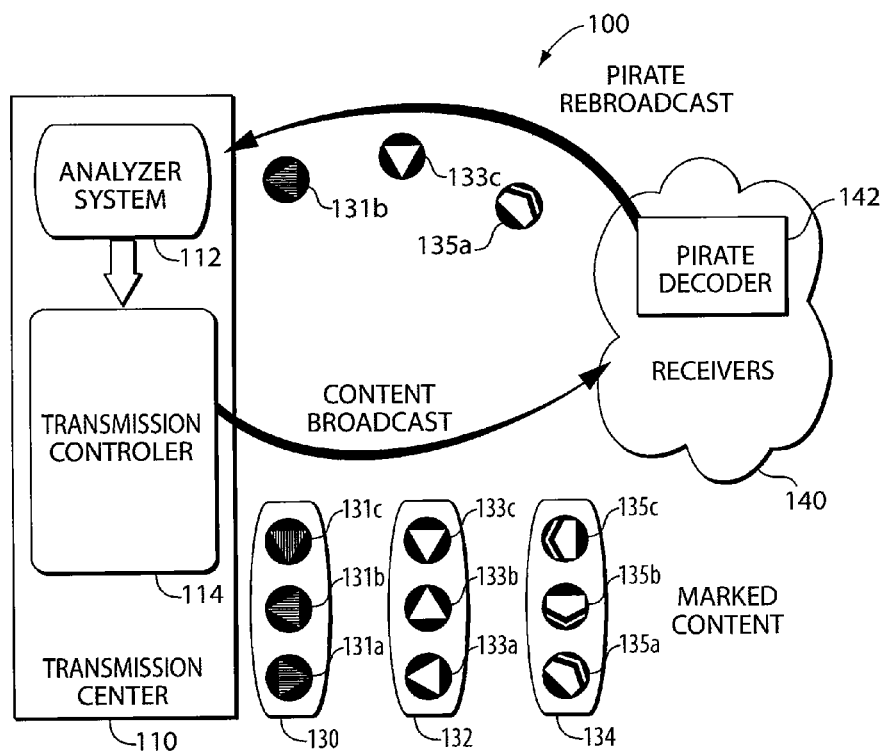
FIG. 1 is a schematic diagram of a system to trace unauthorized rebroadcasts.

Referring to FIG. 1, a schematic diagram of a system 100 to trace unauthorized rebroadcasts of content is shown. The system 100 includes a transmission center 110 to distribute content to a plurality of receivers (or recipients), amongst which may be at least one unauthorized distributor of content. The transmission center generally codes content so that it includes embedded information corresponding to two or more subsets of the plurality of users. Such embedded information may include, for example, watermarks, fingerprint codes, and other types of digital marking codes that are resilient to removal. In some embodiments, the embedded information corresponding to two or more subsets of the plurality of users are added to a single data segment that the transmission center is transmitting to the various recipient (i.e., a stream of data transmitted to all the users includes all the embedded information associated with the two or more subsets) such that upon decoding of the data stream by a particular recipient, the embedded information associated with the subset of users to which the particular recipient belongs is recovered. In some embodiments, the transmission center 110 transmits multiple versions (or variations) of a particular content segment (data segment), with each of the multiple versions directed to, for example, a particular subset of the two or more subsets, and with each of the multiple versions marked with a different digital mark.

As further shown in FIG. 1, the transmission center 110 includes an analyzer system 112 configured to receive rebroadcast transmissions from the at least one unauthorized user, and analyze the rebroadcast transmissions to determine, based on the embedded information in the rebroadcast transmission, which subset(s) of the two or more subsets the embedded information in the received rebroadcast transmissions is associated with. The transmission center 110 also includes a transmission controller 114 to update the state of the system (e.g., add additional subsets and assign recipients into those additional subsets) and mark subsequent data segments in such a way that rebroadcasts of the transmitted data segments by unauthorized distributors will enable narrowing the size of groups that include potential unauthorized users until identification of the unauthorized distributors is achieved. Marked subsequent data segments are subsequently transmitted. The controller 114 may be configured so that it marks sequential data segments with successive portions of some digital mark (e.g., a pre-determined fingerprint or a fingerprint generated on the fly using a fingerprint generation procedure), and once the last portion of a particular code has been embedded into the data segment, subsequent segments may be marked with portions of newly used marking codes. Marking data segments with portions of a code instead of the full marking code decreases bandwidth requirements, but prolongs the process of identifying unauthorized users because it will take a larger numbers of iterations to converge to the identity of the unauthorized user. In some embodiments, the controller 114 is configured to mark every transmission segment with a complete fingerprint code, each associated with one of the subsets of recipient to whom the data segments are transmitted, to enable a more expeditious identification of a subset associated with rebroadcast transmission, and to thus enable a more quick identification of unauthorized distributors.

Thus, as depicted in FIG. 1, the controller 114 marks sequential data segments, at least in part based on the results of the analysis performed by the analyzer system 112 in such a way that identification of unauthorized distributors can be achieved. For example, FIG. 1 shows three sequential data segments 130, 132 and 134 that are each marked with embedded information (e.g., fingerprints). For example, the data segment 130 is marked with embedded marking codes that are associated with three subsets of recipient receiving the data transmitted by the transmission center 110. For illustration purposes, the marking code of segment 130 is depicts as the symbols 131*a-c*, the marking code of segment 132 is depicted using the symbols 133*a-c* and the marking code of segment 134 is depicted using the symbols 135*a-c*. In the example of FIG. 1, a subset 140 (the other subsets are not shown) includes an unauthorized user 142. The unauthorized user may be a subscriber of the transmission center 110, and may thus be authorized to receive content (but not to redistribute it to other non-subscribers). The unauthorized distributor 142 may therefore have a decryption key(s), assigned by the transmission center, or by another system associated or affiliated with the transmission center 110, required to decrypt the coded data segment 130 to enable use of the actual content data in the segment.

Having decoded the data segment, the recovered data includes a recovered digital mark symbol 131*b*. As noted, the marking codes generally cannot be removed from the rest of the content data recovered by the decoding operations performed by the recipients. The marking code may be, for example, a complete or portion of a fingerprint code. In the scenario depicted in FIG. 1, the unauthorized distributor rebroadcasts of the decoded data recovered from the data segment transmitted to it by the transmission center 110 to provided unencrypted (e.g., unscrambled) data to recipients who are not subscribers of the transmission center 110. Thus, the data being rebroadcast includes the marking code symbol 131*b*.

The analyzer system 112 of the transmission center 110 is configured to receive the pirate rebroadcast of the data the transmission center previously transmitted to its plurality of recipients. In some embodiments, the pirate rebroadcast is not restricted to a specific population of recipients, and therefore any recipient connected to the network to which the transmission center and the unauthorized distributor 142 are connected may received the decoded rebroadcast transmission. It is to be noted that in circumstances where the unauthorized transmission is transmitted to a restricted known population of recipient, the identity of the unauthorized distributor can be determined without resorting to marking codes tracing procedures because the unauthorized distributor is in effect assuming a role of an organized content distribution center, including having to perform various administrative functions (e.g., advertise its services, implement subscription methodologies, etc.,) and therefore that unauthorized distributor may be more visible as a source of pirate transmissions.

With continued reference to FIG. 1, the analyzer system 112 receiving the decoded transmissions from the unauthorized distributor 142 analyzes the transmission and determines that the transmission includes the marking code 131*b*. Where the marking code 131*b* is a complete fingerprint code, the analyze module can determine that that code is associated with the subset 140, and base on that determination, the controller 114 (which is in communication with the analyzer system 112) can split the subset 140 into two or more new subsets, and assign each of the recipients of the subset 140 into one of the two or more new subsets. Subsequently, and as will be described in greater details below, the controller 114 determines new marking codes associated with the two or more new subsets to include with subsequent transmission of data segments to thus enable further localization of the identity of the unauthorized distributor 142.

As noted, in some embodiments, transmitted data segments include portions of embedded marking codes. In those circumstances, the identity of the subset that includes the unauthorized user 142 can be determined, with high probability, upon receipt by the analyzer system 112 of several rebroadcast transmissions from the unauthorized distributor 142 by analyzing the multiple received portions of marking codes. For example, as shown in FIG. 1, the unauthorized distributor 142, upon decoding data segments 130 and 132 and 134, using its decryption key(s), recovers the content data in the data segments. The recovered data segments also include the marking codes 131*b*, 133*c* and 135*a* recovered by the decryption key(s) used by the recipients of the subset 140. The recovered data is then rebroadcast, in its decoded form, and is picked up by the analyzer system 112. In some embodiments, the combination of the marking codes 131*b*, 133*c* and 135*a* is sufficient to enable the analyzer system to determine, with high probability, that this combination of marking codes (or rather, the combination of the portions of a marking code) are associated with the subset 140. Subsequently, the controller 114 updates the system state, including splitting the identified subset into two or more new subsets, and including with subsequent transmissions of data segments additional marking codes (or portions thereof) that are associated with the two or more new subsets. Those marking codes (e.g., fingerprint codes) may be newly generated and identify at least the two or more new subsets.

When the unauthorized distributor 142 is identified, the controller module may prevent the unauthorized distributor from decoding any subsequent transmission by, for example, revoking a decryption key(s) used by the unauthorized distributor. Such revocation can be accomplished by, for example, revoking the key(s) associated with the unauthorized distributor 142, and using other keys, excluding the revoked keys, to encode information associated with other recipients of the original subset 140 (i.e., except for the identified unauthorized distributor 142). Initially, every recipient may be assigned a set of keys that may be used to decode data sent by the transmission center. Assignment of keys is performed in such a way that every recipient shares at least some common keys with all other recipients. Subsequently, when subsets are formed, the key(s) used by the recipients of a particular subset are selected from keys that are common to all the recipients in that particular subset. In some embodiments, revocation of the key(s) used by the unauthorized user 142 may be accomplished by removing or revoking at least one key used that is common to all the recipients in that subset that includes an unauthorized distributor. Once the unauthorized distributor is identified, all the other keys associated with that unauthorized distributor are removed, thus disabling that unauthorized distributor. Other techniques and procedure for disabling the unauthorized distributor and preventing that user from decoding received transmissions may be used.

Each of the various systems and devices, for example, the transmission center 110, the analyzer system 112 and/or the controller 114 may be processor-based systems that include a computer and/or other types of processor-based devices suitable for multiple applications. Such devices can include volatile and non-volatile memory elements, and peripheral devices to enable input/output functionality.

Figure 2:
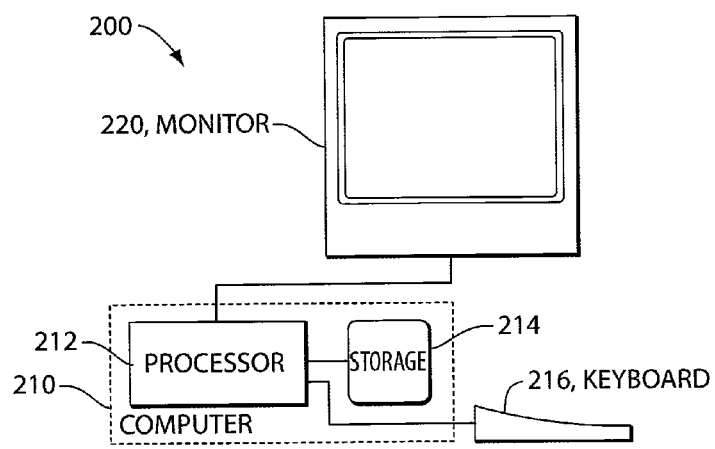
FIG. 2 is a schematic diagram of a generic computing system.

Specifically, and with reference to FIG. 2 showing a schematic diagram of a generic computing system 200 that may be used to implemented any of the processor-based system depicted in FIG. 1, the computing system 200 includes a processor-based device 210 such as a personal computer, a specialized computing device, and so forth, that typically includes a central processor unit 212. In addition to the CPU 212, the system includes main memory, cache memory and bus interface circuits (not shown). The processor-based device 210 includes a mass storage element 214, such as a hard drive associated with personal computer systems. The computing system 200 may further include a keyboard 216, a monitor 220, e.g., a CRT (cathode ray tube) or LCD (liquid crystal display) monitor.

The processor-based device 210 is configured to facilitate, for example, the implementation of the tracing and revocation procedures described herein. The storage device 214 may thus include a computer program product that when executed on the processor-based device 210 performs operations to facilitate the implementation of the tracing and revocation procedures described herein. The processor-based device may further include peripheral devices to enable input/output functionality. Such peripheral devices may include, for example, a CD-ROM drive and/or floppy drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array) or an ASIC (application-specific integrated circuit) may be used in the implementation of the system 200. Other modules that may be included with the processor-based device 210 are speakers, a sound card, a pointing device, e.g., a mouse or a trackball, by which the user can provide input to the computing system 200. The processor-based device 210 may include an operating system, e.g., Windows XP® Microsoft Corporation operating system. Alternatively, other operating systems could be used.

The various systems and devices constituting the system 100 may be connected using conventional network arrangements. For example, the various systems and devices of system 100 may constitute part of a private packet-based network. Other types of network communication protocols may also be used to communicate between the various systems and systems/devices. Alternatively, the systems and devices may each be connected to network gateways that enable communication via a public network such as the Internet. Network communication links between the systems and devices of system 100 may be implemented using wireless (including, for example, satellite-based implementations) or wire-based links. For example, in some embodiments, the transmission center 110 may include broadcasting apparatus (e.g., an antenna, a satellite transmitter, a transceiver such as a network gateway portal connected to a network, etc.) to transmit and receive data signals. Further, dedicated physical communication links, such as communication trunks may be used. Some of the various systems described herein may be housed on a single processor-based device (e.g., a server) configured to simultaneously execute several applications.

Figure 3:
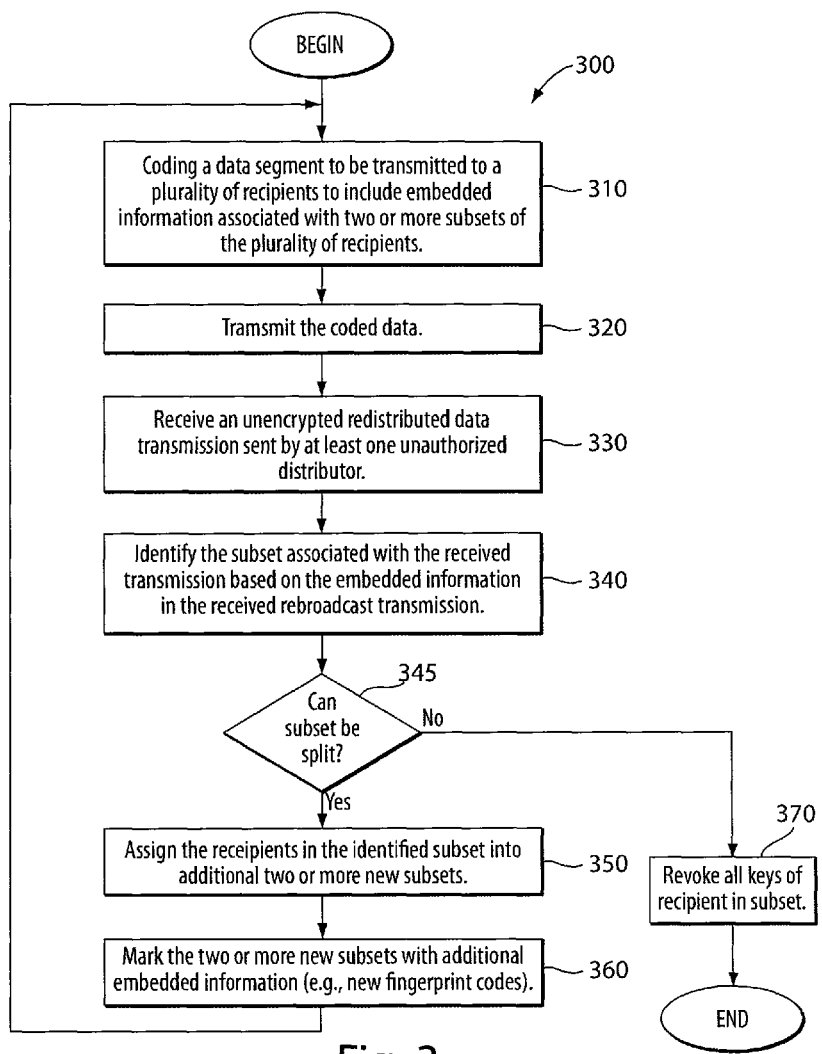
FIG. 3 is a flowchart of a procedure to trace pirate rebroadcast and revoke keys of recipients.

Referring to FIG. 3, a flowchart of a procedure 300 to trace pirate rebroadcast and revoke keys of recipients determined to be the source of the pirate rebroadcasts is shown. To further describe the procedure 300, a mathematical-based description of a tracing and revoking procedure is also provided. As described herein, a transmission center, such as the transmission center 110 shown in FIG. 1, retrieves data that is to be transmitted, e.g., via a broadcast transmission from a satellite or a ground-based antenna, or by transmitting the content to networked recipients. The transmission center performs coding operations 310 on the data to be transmitted to a plurality of recipients to include in the coded data embedded information associated with two or more subsets of the plurality of recipients. Thus, the plurality of recipients is assigned to two or more subsets, and embedded information (e.g., marking codes or portions thereof) associated with the respective two or more subsets are included. In some embodiments, coding of the data also includes encrypting the data in such a way that different subsets are associated with different keys, or combinations of keys, such that each subset of recipients can decrypt the data independently of recipients of other subsets and using keys that are different from keys used by other subsets. The use of multiple sets of keys that are assigned to different subsets thus enables subsequent revocation of some (but not all) keys to prevent recipients determined to be unauthorized distributors from decrypting, and thus re-broadcasting, decoded data.

Figure 4:
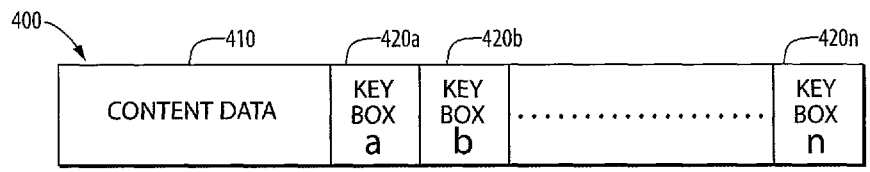
FIG. 4 is a schematic diagram of an embodiment of a data structure of a data segment to be transmitted.

Referring to FIG. 4, a schematic of an embodiment of a data structure 400 of a data segment to be transmitted by a transmission center is shown. The data structure 400 includes the content data part 410 which is encrypted by a particular encryption key (the encryption key may be a key selected from a pre-determined collection of available encryption keys, or may be an encryption key that is dynamically generated by a key generator module.) The data structure 400 also includes subsets key boxes 420a-n, that may each include an encrypted copy of the encryption key used to code the content data contained in the content data part 410. Encryption of the encryption key used to perform the content data encryption is performed using encryption keys associated, and pre-assigned, to each of the recipients in the subsets a to n (i.e., the keys necessary to perform the decryption may have been provided in advance to the recipients in the various subsets). Thus, upon receipt of a data segment by a recipient assigned to one of the subsets, the recipient will use a corresponding decryption key to decrypt the corresponding subset box that was previously encrypted using a key associated with that subset. The decoding (decryption) of the corresponding subset box 420 will provide the recipient with a copy of the key required to perform decryption of the data content in data content part 410. In some embodiments, during the coding of the encryption key for each of the subset boxes 420a-n, the marking data (e.g., fingerprint) associated with the subset is included in the box such that upon decryption of the box associated with the decrypting subset, the marking code will be recovered and be included with the recovered data segment.

In some embodiments, a Subset Cover Scheme (SCS) may be implemented so that the SCS is generated according to SCS=(N, J, Cover(·), Split(·, ·)). N represents the number of recipients. Cover(·) is a function that given a set of users $R \subseteq N$, the function outputs a collection of subsets $\{S_{i_1}, \ldots, S_{i_v}\} \subseteq J$, that is referred to as a "broadcast pattern" (or simply, a "pattern"), and denoted by P such that $N \backslash R = \cup_{j=1}^v S_{i_j}$ (the notation N\R means N users excluding R revoked users). Generally, all subsets in the Cover (N\R) are disjoint. Each subset $S_j$ is assigned a unique key $k_j$ and each receiver $u \in N$ is given all keys that correspond to the subsets that u belongs to.

Split(·, ·) is a function that, given a broadcast pattern $P=\{S_{i_1}, \ldots, S_{i_v}\}$ and a set of disjoint subsets $T \subseteq J$, splits each subset of P\T (e.g., based on the "bifurcation property" described in Naor et al., "Revocation and Tracing Schemes for Stateless Receivers", CRYPTO 2001, LNCS 2139, Spring 2001, pp. 41-62, the content of which is hereby incorporated by reference in its entirety) and returns an updated broadcast pattern that is derived from P by replacing the subsets P\T with the resultant split collection of subsets. In situations where a subset in P\T cannot be split it would be removed by the function Split(·, ·). In some embodiments, the broadcast pattern includes the individual key boxes associated with the respective subsets of recipients that each contains the key necessary to decode the data segment.

As noted, the data segments also include marking codes (e.g., fingerprint codes) to facilitate the tracing of unauthorized distributors. In some embodiments, generation of marking codes (e.g., fingerprint codes) to be embedded within the data segments may be performed by a pair of procedures (CodeGen, Tracing) that are defined as follows. CodeGen is a probabilistic procedure that receives as input the values (n, v, w, q) where $v=\log(1/\epsilon)$ and $\epsilon$ is a security parameter, and outputs a code C of n codewords over $\Sigma^l$ where $|\Sigma|=q$ (such codes are referred to as (l, n, q)-codes), as well as a tracing key tk. The procedure Tracing is configured to identify with high probability at least one of the unauthorized distributors (also referred to as traitors) by combining their codewords. The fingerprinting code is called "open" if there is no tracing key associated with the fingerprint code. Some examples of fingerprint codes that may be used include:

1. An open one-level fingerprinting code described, for example, in B. Chor et al., "Tracing Traitors", IEEE Transactions on Information Theory, Vol. 46, 3, pp. 893-910, 2000, the content of which is hereby incorporated by reference in its entirety. In such a fingerprinting code, a w-TA $(l, n, 2w^2)$-code C is generated using probabilistic methods. This code is an open code. The implemented code generation procedure samples l hash functions. The hash function $H_i: \{1, \ldots, n\} \rightarrow Q$ corresponds to the i-th position in the code for $i=1, \ldots, l$. A codeword is defined as the sequence of hash values: the s-th codeword is an l-tuple $(H_1(s), \ldots, H_l(s))$. According to the analysis described in "Tracing Traitors", this code generation procedure generates a w-TA code with high probability, assuming that $l > 4w^2 \log n$.

2. Linear fingerprinting codes that are based on a linear subspace with dimension r over Q where Q is a finite field with q elements. The code generation procedure produces an (l, n, q)-code C and is deterministic. If the condition $l > w^2(r-1)$ holds and C is a maximum distance separable code, then the code C is a w-TA code. Reed-Solomon codes can be used to construct w-TA codes in this fashion. A Reed-Solomon code defined over a polynomial of degree r-1 in a field $F_q$ will provide a w-TA code with $w \leq \sqrt{(q-1)/(r-1)}$ and $q^r$ codewords.

3. The Tardos code, described, for example, in G. Tardos, "Optimal Probabilistic Fingerprint Codes", ACM 2003, pp. 116-125, the content of which is hereby incorporated by reference in its entirety, is defined over a binary alphabet. The code generation procedure samples n bit strings of length l. According to the analysis provided in "Optimal Probabilistic Fingerprint Codes," given a security parameter $\epsilon$, if the length l of C is $O(w^2 \log(n/\epsilon))$, then the Tracing procedure will be able to recover an element in $C_0$ with high probability $1-\epsilon$ as long as $|C_0| \leq w$. If the length of the code is increased to $O(n^2 \log(n/\epsilon))$ then the Tracing procedure can succeed for any coalition size.

Other types of fingerprint codes may be used.

To code a message M that is to be transmitted to the various recipients, a pair (state, V) is first determined where a state includes a pattern $P \subseteq J$ of keys, an instance of a fingerprinting code (CodeGen, Tracing) and a message transmission index m. V is defined as $V \subseteq J$, such that the following holds: u is such that $I_u \not\subseteq V$ if and only if $(I_u \cap P) \backslash V \neq 0$. Intuitively, V contains the keys of all revoked users/recipients and P is a set of disjoint subsets whose corresponding keys enable the transmission of content to the recipients who are not revoked (thus, the state update also determines keys to be used.)

In embodiments based on the above coding implementation, prior to revocation of any unauthorized recipients, an initial data segment (or state) $\sigma_0$ is initialized as $\sigma_0 = \langle \text{state}_0, V_0 \rangle$ where $V_0 = 0$, and $\text{state}_0$ includes (P, FC, 0) selected as follows, (i) P=Cover(N), (ii) FC $\rightarrow$ CodeGen(|P|, v, w, q), i.e., FC=(C, tk) where C is a (l, |P|, q)-code and tk is the corresponding tracing key. It is to be noted that each key index $S_j$ EP is associated with a unique codeword $y_j \in C$ for $j=1, \ldots, |P|$.

Thus, in some embodiments, to construct the coded data segment to be transmitted, the content data is encrypted using a general encryption key (which may be dynamically changed for each separately transmitted data segment), and the key necessary to decrypt the message is encrypted by the keys associated with the respective subsets.

Turning back to FIG. 3, coded data segments are transmitted 320. In some embodiments, data segments are transmitted to recipients interconnected to the transmission center via a network, such as the Internet, a telephony network, a cable-based network operated by content providers, etc. In some embodiments, the recipients may be interconnected via wire-based networks, wireless network (including a satellite-based network) and/or a combination of wire and wireless connections. In some embodiments, the transmission center may broadcast the data segment so that the signals themselves may be intercepted by any user. However, generally in broadcast type implementations, only recipients that have the necessary keys to decode the data segments can recover the actual content data. As noted, recipients are assigned to two or more subsets that, in some implementations, are associated with keys that enable the recipients to decrypt the data segments transmitted by the transmission center and thus recover the content data. In some implementations, the keys provided to a recipient in a particular subset enable the recipient to decrypt a portion of the data segment containing the key to recover the content data. Decryption of the portion containing the key required to decrypt the content data also results in the recovery of the marking code embedded into the data segment such that any redistribution of the content will include that marking code. The marking code (e.g., fingerprint codes) may be adapted so as to not be susceptible to removal. For example, attempt to remove marking codes may cause the actual content data to become corrupted or otherwise unusable.

In circumstance where at least one unauthorized user is using its key to recover the content data and redistribute the unencrypted content to other users, the embedded information added to the data segments enables tracing and identification of the at least one unauthorized distributor. Thus, a tracing system, such as the analyzer system 112 depicted in FIG. 1, receives 330 the unencrypted redistributed data transmitted by the at least one unauthorized distributor. The received rebroadcast data includes embedded information associated with at least one of the two or more subsets of recipients, and includes the at least one of the one or more unauthorized distributors. Generally, pirate redistribution of the content are made without targeting specific subscribers. Accordingly, under those circumstances, the tracing system identifies redistributed content (e.g., content available on the network) that corresponds to content previously transmitted by the transmission center, and begins receiving that content for further processing/analysis. In circumstances where the unauthorized distributor distributes the content to specific subscribers, the tracing system may be required to infiltrate the redistribution system (e.g., by subscribing to the system that is redistributing the content previously transmitted by the distribution center).

Having received the rebroadcast transmissions including the embedded information associated with at least one of the two or more subsets, the at least one of the two or more subsets that includes at least one of the unauthorized users is identified 340 based on the embedded information in the received rebroadcast transmissions. A tracing procedure over the code C that is employed (e.g., in the Transmit procedure described herein) can identify a subset containing a traitor with high probability. This is because of the fact that the codewords of C are assigned to subsets of devices, i.e., the detection of an unauthorized user (or a "traitor") using the Tracing procedure is effectively equivalent to finding a subset that contains a traitor. As noted above, once such a subset is found, this subset will be split into two (2) or more subsets by applying the Split function on the subset. The updated set of recipients, i.e., the subsets in the new partition, may, in some embodiments, be reassigned new codewords from possibly a fresh fingerprinting code.

More particularly, as noted, in some embodiments, an entire marking code identifying a subset may be embedded within a data segment transmitted by a transmission center and thus be included in rebroadcast transmissions, in which case the analyzer system may be able to immediately (e.g., based on a single received rebroadcast transmission of a data segment) identify the subset including the unauthorized distributor. Such a situation typically corresponds to systems in which the pattern size P is small enough so as to mark each subset differently.

Figure 5:
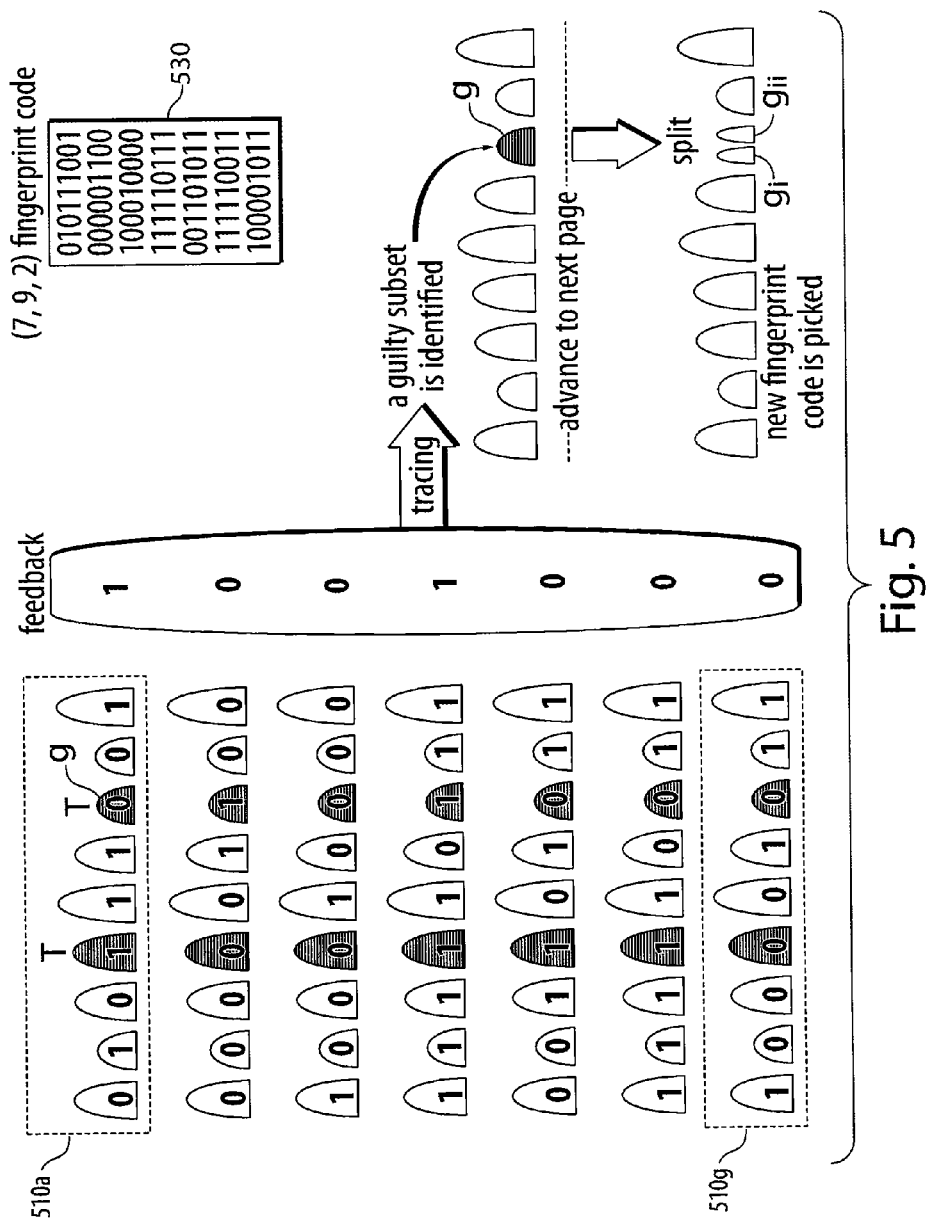
FIG. 5 is a schematic diagram of a processing example (e.g., tracing and analyzing) of data segments containing portions of fingerprint codes.

In some embodiments, the data segments are coded with portions of marking codes, and accordingly several rebroadcast transmissions have to be received and processed/analyzed to enable the identification of the subset associated with the recovered portions of a marking code. With reference to FIG. 5, a schematic diagram of a processing example (e.g., tracing and analyzing) of data segments containing portions of fingerprint codes is shown. Data segments 510a-g each contain a recovered content portion (not shown) as well as individual portions that are respectively associated with the subsets of recipient to which the data segments are being transmitted. As noted, in some embodiments, the individual portions may be the key boxes containing a copy of the key required to decrypt the encrypted content portion of the data segment and further contain a marking, or a portion thereof, associated with the respective subsets. For the purposes of illustration, the data segments of FIG. 5 are shown as having eight (8) subsets of recipients. Further, in the example of FIG. 5, subset portions d and g are subsets suspected as containing pirate recipients. To localize the subsets that, with high probability, contain at least one unauthorized distributor ("traitor"), the individual subset portions of the data segments 510a-g are marked with, for example, a (7, 9, 2) fingerprint code such as the fingerprint code 530 shown in FIG. 5. The choice of the fingerprint code (or other types of marking codes) with which to mark the data segment is flexible, and different codes may be used at different stages (i.e., after a particular subset has been identified as containing an unauthorized user, and the identified subset is split into two or more additional new subsets).

The rebroadcast transmissions transmitted by the unauthorized distributor are received by, for example, the analyzer system (such rebroadcast transmission are effectively feedback transmission for the analyzer system). The portions of the marking code recovered from the rebroadcast transmissions form the reconstructed code that enables identification of the subset including the traitor. The feedback code is then used to identify, in this example, subset g as the subset containing the traitor.

Turning back again to FIG. 3, having identified the at least one subset including at least one unauthorized distributor, the recipients in the identified at least one subset are assigned 350 into additional two or more new subsets such that the at least one unauthorized distributor is assigned to one of the two or more additional new subsets. The two or more additional new subsets each have fewer assigned recipients than the number of recipients that were in the identified subset. As noted above, in some implementations, the assignment of recipient into two or more additional new subsets is performed by the procedure Split(·, ·) described herein. The assignment of the recipients in the identified at least one subset into two or more additional new subsets may be performed, for example, by the controller 114 depicted in FIG. 1. As shown in FIG. 5, the $7^{th}$ subset g is split into two additional new subsets denoted $g_i$ and $g_{ii}$, such that subsequent data segments generated and transmitted by the transmission center are adapted to be associated with ten (10) subsets instead of the nine (9) that were previously used in transmitted data segments. In some embodiments, the assignment procedure may assign recipients to more than two subsets.

The two or more new subsets into which the recipients in the just identified subset are assigned are marked 360 with additional embedded information (e.g., newly generated fingerprint codes) to enable identification of one of those subsets upon a subsequent receipt and processing of rebroadcast transmissions by the unauthorized distributor(s) now assigned to one of those new subsets. The splitting of the identified subset into two or more additional new subsets and their marking with new embedded information enables the localization of the traitor recipient (rebroadcasting the data originally transmitted by the transmission center) to thus narrow the identity of the possible recipients who may be the at least one unauthorized distributors.

Assignment of the recipients in the identified at least one subset into two or more additional new subsets further includes a state updating operation that is used to generate the coding of the next sequence of data segments to be transmitted to the recipients (who are now grouped into a larger number of subsets, e.g., the new additional subsets resulting from the split of the identified subset, and the subsets that were not split). Particularly, and with reference to the mathematical description used in relation to the coding operations at 310 of FIG. 3, given the current state of the system $\sigma_{p-1} = \langle state_{p-1}, V_{p-1} \rangle$ and a feedback symbol $f \in \Sigma$, the system state is first updated to $\sigma_p = \langle state_p, V_p \rangle$. The update of the system is done as follows. The previous message transmission index m and the set of keys P are pulled out from $\sigma_{p-1}$. If m<l where l is the length of the code C=(l, |P|, q) in $state_{p-1}$ then m is increased by one and the feedback symbol f is stored.

Otherwise (i.e., if m=l), the broadcast pattern P needs to be updated. This is done as follows. The feedback values of all the l recent transmissions are used to define a codeword $a \in \Sigma^l$ and then a set of subsets $T \subseteq P$ is identified by computing B=Tracing(a, tk) and defining T as $S_j \in T$ if and only if $y_j \in B$ (here the 1-1 correspondence between the pattern subsets and codewords in C is used). Subsequently, the broadcast pattern is updated by performing the operation P'=Split(P, T). A new fingerprint code C' may now be used support as many codewords as the size of new broadcast pattern P' by performing the CodeGen procedure as described in relation to the coding operation at 310 of FIG. 3. The state updating operation also identifies one or more common keys that are common to all the recipients in the identified subset, and revokes those one or more common keys, thus further removing the keys that are available to the unauthorized distributor (now assigned to one of the additional new subsets.) The keys that are identified and revoked may be added to the vector $V_p$ of revoked keys, i.e., $V_p$ is set to $V_{p-1} \cup \{I_u | \exists S_j \in T \text{ where } S_j = \{u\}\}$. Furthermore, the message transmission index m is set to 1.

After completion of the state updating operations, the transmission procedure proceeds to select the set $J \subseteq J \times \Sigma$. This is done as follows: the triple (P, FC, m) is extracted from the new updated state $\sigma_p$. The subset J is defined so as to include all pairs $(S_j, y_j[m])$ for j=1, 2, . . . |P| where $y_j[m]$ denotes the $m^{th}$ symbol of the codeword $y_j \in C$.

Subsequently, a new content data to be transmitted is constructed by, for example, encrypting the data with a general key, and encrypting the key necessary to decrypt the encrypted data using the various keys associated with the subsets, including the new added subsets. The individual key boxes resulting from this encryption operation also include the embedded marking codes included with the individual key boxes of the coded data segment that identify the subsets of recipients, including the two or more new subsets. The keys used to encrypt the two or more additional new subsets are selected from what is a smaller pool of available keys (because one or more keys of the pre-split subset were revoked.) Particularly, the keys selected for a particular subset are keys that are still available at all the decoders of the recipients in the subset.

The procedure of coding data segments, transmitting the segments to the population of recipients, receiving of rebroadcast transmission from at least one unauthorized distributor, identifying a subset corresponding to the received rebroadcast transmissions and assigning recipients in the identified subsets into two or more additional new subsets is iteratively repeated until no further splitting can be performed on any of the identified subsets (e.g., the identified subsets include a single recipient corresponding to the at least one of the unauthorized distributors), as determined at 345. When a subset can no longer be split, this implies that the recipient included in that subset is, with high probability, the recipient corresponding to the unauthorized distributor.

Having identified at least one of the unauthorized distributor, all the keys associated with the unauthorized distributor are revoked 370, and subsequent data segments include individual key boxes that may be encrypted with the remaining keys.

Thus, using the mathematical description used in relation to the coding operations at 310 and the assigning operation at 360 of FIG. 3, given the current state $\sigma_{p-1} = \langle state_{p-1}, V_{p-1} \rangle$ and a set R, a new pattern P is selected as Cover(N\ $(R \cup R_{p-1})$ where $R_{p-1} = \{u | I_u \subseteq V_{p-1}\}$, i.e., subset formation is performed on the set of N recipients, excluding the revoked users. Any data encryption (e.g., encryption of individual key boxes associated with the subset) is performed using keys other than those already revoked. Subsequently, a new state states is formed by selecting a new fingerprinting code FC→CodeGen(|P|, v, w, q). The procedure returns $\langle state_p, V_p \rangle$ where $state_p$=(P, FC, 0) and $V_p = V_{p-1} \cup (\cup_{u \in R} I_u)$.

Figure 6:
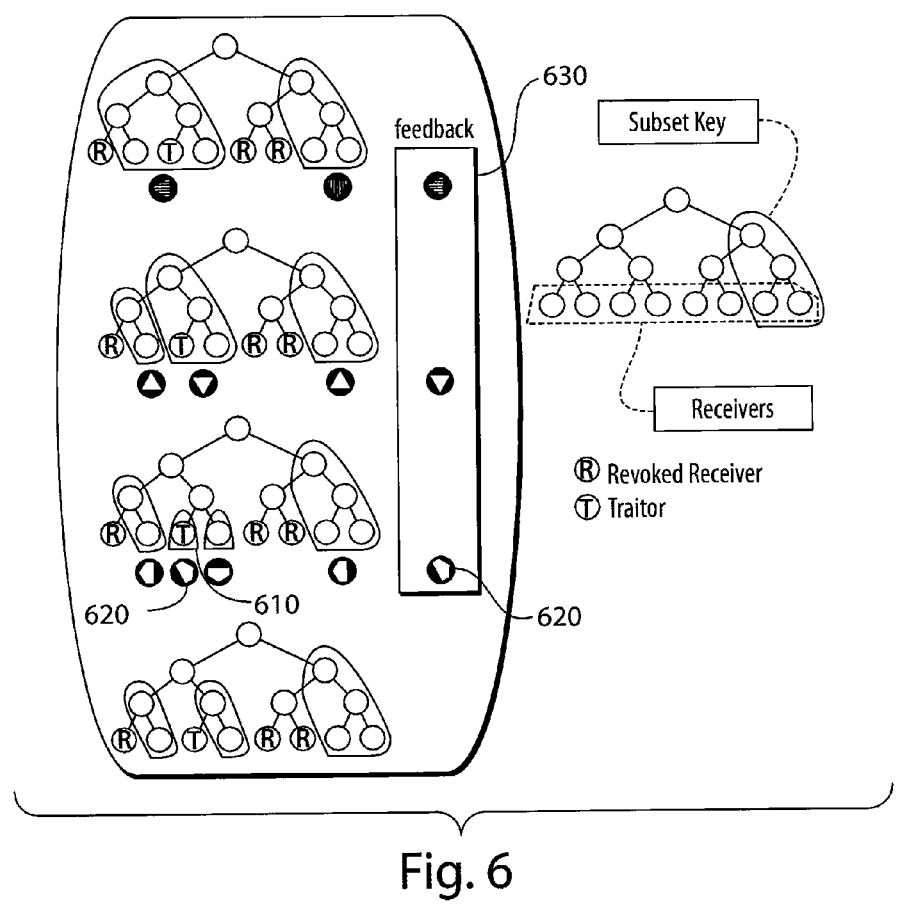
FIG. 6 is a schematic diagram depicting the iterative splitting of a subset that includes an unauthorized user to trace the unauthorized user.

FIG. 6 shows a schematic diagram depicting the iterative splitting of a subset including a traitor, until a rebroadcast transmission is received that includes only the traitor. As shown, the identification of a subset 610 is completed once the marking code 620, which is part of the feedback sequence 630 analyzed by, for example, the analyzer system 112 shown in FIG. 1, is determined to be the marking code included with the data segment provided by the traitor recipient. After the subset 610 is identified, all the keys associated with that subset (and therefore with the traitor) are revoked.

To determine the efficiency of a tracing and revoking procedure, the embodiments of the example tracing and revoking procedure depicted in FIGS. 3 and 5 are considered. Without loss of generality, the revoking procedure analyzed is one employing the subset-cover scheme (SCS) of the Subset Difference methodology described, for example, in "Revocation and Tracing Schemes for Stateless Receivers" by Naor et al. At any system state $\sigma_p$ with a set of revoked users R with R=|R| and a set of t subsets known to contain traitors, the number of subsets in the broadcast pattern covering the enabled set of users will be a function of R and t. The pirate rebroadcast bound would depend on the tracing procedure over the code C of size O(R+t). Under these circumstances, O(log N) stages will generally be required to identify at least one traitor.

Consider a set of traitors T with |T|=t, a set of revoked users R with |R|=R. If $\sigma$ is a state distributed according to Revoke $(\sigma_0, R)$ then the length of any pirate rebroadcast starting at the state v is O(l·t·log N) with probability 1−(t·log N·ε') where l is the length of the fingerprinting code used to instantiate the scheme and ε' represents the failure probability of the associated Tracing procedure. The dependency of μ (the bound of the number of transmission a traitor coalition can withstand) in R is through the fingerprinting code length l. Moreover, if there is a bound w on the number of traitors (i.e., t≤w) this parameter will also be a function of l. The actual pirate rebroadcast bound μ will depend on the choice of the code.

To analyze the efficiency of the procedure with more specific examples, three instantiations of the tracing and revoking procedure are considered. The efficiency of a tracing and revoking procedure may be assessed, for example, on the basis of a bound μ. The bound μ is generally a function of the number of recipients N, the number of unauthorized distributors (e.g., traitors) t, and the number of already revoked users R. The efficiency of the procedure is also assessed on the basis of, for example, the communication overhead of the procedure. The communication overhead ψ of a procedure is the amount of replication the procedure employs in order to trace the rebroadcasts. Generally, the communication overhead ψ of a tracing procedure is also a function of N, t and R.

In the first instantiation, optimal codes such as those described in G. Tardos, "Optimal Probabilistic Fingerprint Codes", in conjunction with Naor's subset-difference subset cover set system (as described above) are used. Such an implementation results in a communication overhead $\psi=O(R+t)$ and a rebroadcast bound $\mu=O(t(R+t)^2 \log N \log((R+t)t \log N \epsilon^{-1}))$, where, as noted, R is the number of revoked users, t the number of traitors (e.g., unauthorized users), N is the number of users and $\epsilon$ is the error probability. This bound can be derived based on the fact that the length of Tardos' optimal codes is $O(n^2 \log(n/\epsilon))$ where n is the number of codewords. It is to be noted that this implementation tolerates an unlimited number of traitors and revocations.

In a second instantiation, Tardos' optimal codes are again used, along with an upper bound on the number of traitors, w. In such an implementation, the code has a length of $O(w^2 \log n/\epsilon)$ and with the number of codewords being n, the resultant rebroadcast bound is expressed as $O(t\, w^2\, (\log N) \log((R+t)t \log N \epsilon^{-1}))$. Thus, there is only a logarithmic dependency on the number of revocations in the system.

In a third instantiation, a marking alphabet is used instead of the binary marking used in the previous two instantiations. Use of a marking alphabet enables a relatively short rebroadcast bound of $O(t \log(N/t))$. Additionally, in this instantiation, the complete subtree methodology described in Naor's "Revocation and Tracing Schemes for Stateless Receivers" is used in the implementation of the subset cover system. Generally, in the complete subtree methodology users are aligned as the leaves of a complete binary tree and the set system defines a key for any complete binary subtree of the total tree. In this instantiation, a marking alphabet of 2t+1 is used, where t is the number of traitors to assign to the subsets that result from application of the Split($\cdot$, $\cdot$) procedure of the underlying subset cover scheme. Given that the number of steps required to trace all t traitors equals the number of nodes in the Steiner tree of the t leaves that correspond to the traitors, the maximum pirate rebroadcast length is determined to be $O(t \cdot \log(N/t))$. This rebroadcast length is superior to the rebroadcast length achieved by the implementation described in Fiat's "Dynamic Traitor Tracing", which achieves a rebroadcast length of $O(t \cdot \log N)$.

The subject matter described herein can be implemented as one or more computer program products, i.e., one or more computer programs tangibly embodied in an information carrier, e.g., in a machine-readable storage device, for execution by, or to control the operation of, data processing apparatus, e.g., a programmable processor, a computer, or multiple computers.

A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both.

The computing system can include clients and servers. A client and server are generally remote from each other in a logical sense and typically interact through a communication network. The relationship of client and server arises by virtue of computer programs running on the respective computers and having a client-server relationship to each other.

Other Embodiments

A number of embodiments have been described. Nevertheless, it will be understood that various modifications may be made without departing from the spirit and scope of the invention. Accordingly, other embodiments are within the scope of the following claims.

What is claimed is:

1. A method for tracing and disabling one or more individual unauthorized recipient distributors of content originally transmitted by a distribution center and received by the recipient distributors, the content comprising one or more data segments, the method comprising:

receiving rebroadcast transmissions of the content comprising a data segment previously transmitted by the distribution center, the received rebroadcast data segment including embedded information associated with a subset of recipients of the data segment including at least one of the one or more individual unauthorized distributors;

identifying based on the embedded information in the received rebroadcast transmissions a subset of recipients of a data segment that includes the at least one of the one or more individual unauthorized distributors;

assigning recipients in the identified subset of recipients into two or more new subsets such that the at least one of the one or more individual unauthorized distributors is assigned to one of the two or more new subsets, each of the two or more new subsets having fewer assigned recipients than the number of recipients in the identified subset;

coding a subsequent data segment to be transmitted with embedded information associated with the two or more new subsets; and repeating the receiving, identifying, assigning and coding steps on the two or more new subsets until a rebroadcast transmission is received that is associated with a subset consisting of an individual recipient corresponding to the at least one of the one or more individual unauthorized distributors.

2. The method of claim 1, wherein coding further comprises:

in response to receipt of the subset including the single recipient corresponding to the at least one of the one or more individual unauthorized distributors, coding further subsequent data segments with encryption codes such that the single recipient corresponding to the at least one of the one or more individual unauthorized distributors cannot decrypt the further subsequent data segments, thereby disabling further rebroadcast of content by the individual unauthorized distributor.

3. The method of claim 1, wherein assigning further comprises:

identifying one or more keys that are common to all the recipients in the identified at least one of the two or more subsets;

and wherein coding the subsequent data segment further comprises:

encrypting the data segment using keys excluding the identified one or more common keys of the recipients in the identified subset.

4. The method of claim 1, wherein at least one of the embedded information and the additional embedded information comprise one or more of: fingerprint codes and watermarks.

5. The method of claim 1, wherein the embedded information included in the received rebroadcast transmission includes a portion of a marking code identifying the at least one of the one or more unauthorized distributors such that a composite of the portion of the marking code and other portions of the marking code received in other rebroadcast transmissions that are in sequence with the received broadcast transmission form the marking code.

6. The method of claim 1, wherein coding the subsequent data segment to be transmitted comprises:
encrypting the subsequent data segment using a first encryption key; and
encrypting the first encryption keys with additional keys, at least some of the additional keys corresponding to the two or more new subsets.

7. The method of claim 6, wherein encrypting the first encryption key comprises:
encrypting with keys common to all recipients in the respective two or more new subsets.

8. The method of claim 1, wherein the additional embedded information corresponds to any number of variations ranging from a minimum number of two variations to any number that is allowed by the nature of the underlying media.

9. A method for tracing and disabling one or more individual unauthorized recipient distributors of content originally transmitted by a distribution center and received by the recipient distributors, the content comprising one or more coded data, the method comprising:
coding data to include in the coded data embedded information associated with two or more subsets of a plurality of recipients;
transmitting the coded data to the plurality of recipients;
receiving rebroadcast transmissions from the plurality of recipients of the content comprising the coded data previously transmitted by the distribution center, the received rebroadcast data segment including embedded information associated with a subset of the plurality of recipients including at least one of the one or more individual unauthorized distributors;
identifying based on the embedded information in the received rebroadcast transmissions a subset of the plurality of recipients of coded data that includes the at least one of the one or more individual unauthorized distributors;
assigning recipients in the identified subset of the plurality of recipients into additional two or more new subsets such that the at least one of the one or more individual unauthorized distributors is assigned to one of the two or more new subsets, each of the two or more new subsets having fewer assigned recipients than the number of recipients in the identified subset;
marking additional content transmitted by the distribution center to the two or more new subsets with embedded information identifying at least the two or more new subsets; and
iteratively repeating the steps of coding, transmitting, receiving, identifying, assigning and marking on the two or more new subsets until a rebroadcast transmission is received that is associated with a subset consisting of an individual recipient corresponding to the at least one of the one or more individual unauthorized distributors.

10. The method of claim 9, wherein assigning further comprises:
identifying one or more keys that are common to all the recipients in the identified at least one of the two or more subsets;
and wherein coding the data further comprises:
coding a subsequent data segment to encrypt the subsequent data segment using keys excluding the identified one or more common keys of the recipients in the identified at least one of the two or more subsets.

11. The method of claim 9, wherein at least one of the embedded information and the additional embedded information comprise one or more of: fingerprint codes and watermarks.

12. A system for tracing and disabling one or more individual unauthorized distributors of content originally transmitted by a distribution center to a plurality of subsets of recipients, the system comprising:
a transceiver to:
transmit coded data included in the content, the coded data including embedded information associated with the plurality of subsets of recipients; and
receive rebroadcast transmissions by the plurality of subsets of recipients of the coded data previously transmitted by the distribution center, the received rebroadcast transmissions including the embedded information associated with at least one of the plurality of subsets of recipients, the at least one of the plurality of subsets including at least one individual unauthorized distributor; and
at least one processor-based computing device that, when executing computer instructions stored on a storage medium connected to the at least one processor-based computing device, is configured to:
identify based on the embedded information in the received rebroadcast transmissions the at least one of the plurality of subsets that includes the at least one individual unauthorized distributor;
assign recipients in the identified at least one of the plurality of subsets into additional two or more new subsets, each of the two or more new subsets having fewer assigned recipients than the number of recipients in the identified at least one of the plurality of subsets;
mark additional content transmitted by the distribution center to the two or more new subsets having fewer assigned recipients with embedded information identifying the two or more new subsets; and
iteratively repeat the identifying, assigning and marking operations on the new two or more subsets and iteratively cause the transmitting and receiving operations performed by the transceiver until a rebroadcast transmission is received that is associated with a subset consisting of an individual recipient corresponding to one of the at least one or more individual unauthorized distributors.

13. The system of claim 12, wherein the transceiver comprises:
a network gateway portal connected to a network that is further connected to at least some of the plurality of recipients.

14. The system of claim 13, wherein the network comprises one or more of: a wired network and a wireless network.

15. The system of claim 12, wherein the at least one processor-based computing device is further configured to:
code the data transmitted to the plurality of recipients.

16. The system of claim 15, wherein the at least one processor based device configured to assign is further configured to:
- identify one or more keys that are common to all the recipients in the identified at least one of the two or more subsets;
- and wherein the at least one processor-based device configured to code the data is further configured to:
- code a subsequent data segment to encrypt the subsequent data segment using keys excluding the identified one or more common keys of the recipients in the identified at least one of the two or more subsets.

17. The system of claim 12, wherein at least one of the embedded information and the additional embedded information comprise one or more of: fingerprint codes and watermarks.

18. A computer program product residing on a computer readable medium and comprising computer instructions that when executed on a processor-based device at a distribution center cause the processor-based device to:
- code data to include in the coded data embedded information associated with at least one subset of a plurality of recipients;
- transmit the coded data to the at least one subset of a plurality of recipients;
- receive rebroadcast transmissions of the content comprising the coded data previously transmitted by the distribution center, the received rebroadcast data segment including embedded information associated with the at least one subset of the plurality of recipients, the at least one subset of the plurality of recipients including at least one individual unauthorized distributor;
- identify based on the embedded information in the received rebroadcast transmissions the at least one subset that includes the at least one individual unauthorized distributor;
- assign recipients in the identified at least one subset into additional two or more new subsets, each additional two or more new subsets having fewer assigned recipients than the number of recipients in the identified at least one subset, such that the at least one individual unauthorized distributor is assigned to one of the two or more new subsets;
- mark additional content transmitted by the distribution center to the additional two or more new subsets with embedded information identifying at least the two or more new subsets; and
- iteratively repeat the coding, transmitting, receiving, identifying, assigning and marking on the additional two or more new subsets until a rebroadcast transmission is received that is associated with a subset consisting of an individual recipient corresponding to one of the at least one of the one or more individual unauthorized distributors.

19. The computer program product of claim 18, wherein the computer instructions that cause the processor-based device to assign further comprise instructions that, when executed, cause the processor-based device to:
- identify one or more keys that are common to all the recipients in the identified at least one of the two or more subsets; and
- wherein the computer instructions that cause the processor-based device to code further comprise instructions that, when executed, cause the processor-based device to:
- code a subsequent data segment to encrypt the subsequent data segment using keys excluding the identified one or more common keys of the recipients in the identified at least one of the two or more subsets.

* * * * *